(12) United States Patent
Hammerer (10) Patent No.: US 11,789,126 B2
(45) Date of Patent: Oct. 17, 2023

(54) HANDHELD LASER DISTANCE METER

(71) Applicant: LEICA GEOSYSTEMS AG, Heerbrugg (CH)

(72) Inventor: Markus Hammerer, Fraxern (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 945 days.

(21) Appl. No.: 16/566,948

(22) Filed: Sep. 11, 2019

(65) Prior Publication Data

US 2020/0081098 A1    Mar. 12, 2020

(30) Foreign Application Priority Data

Sep. 11, 2018   (EP) ..................................... 18193809

(51) Int. Cl.

| G01S 7/48 | (2006.01) |
|---|---|
| G02B 27/30 | (2006.01) |
| G01S 7/481 | (2006.01) |
| G01B 11/02 | (2006.01) |
| G01S 17/10 | (2020.01) |

(52) U.S. Cl.
CPC .......... *G01S 7/4814* (2013.01); *G01B 11/026* (2013.01); *G01S 17/10* (2013.01); *G02B 27/30* (2013.01)

(58) Field of Classification Search
CPC ...... G01S 7/4814; G01S 7/4813; G01S 17/08; G01S 7/481; G02B 3/08; G01C 15/002
See application file for complete search history.

(56) References Cited

U.S. PATENT DOCUMENTS

| 7,142,288 B2 | 11/2006 | Stierle et al. |
| 7,796,250 B2 | 9/2010 | Wolf et al. |
| 7,933,055 B2 | 4/2011 | Jensen et al. |
| 8,102,515 B2 | 1/2012 | Skultety-Betz et al. |

(Continued)

FOREIGN PATENT DOCUMENTS

| CN | 1761855 A | 4/2006 |
| CN | 103983255 A | 8/2014 |

(Continued)

OTHER PUBLICATIONS

European Search Report dated Mar. 11, 2019 as received in Application No. 18193809.3.

*Primary Examiner* — Tsion B Owens
(74) *Attorney, Agent, or Firm* — Maschoff Brennan (57) ABSTRACT

A laser distance meter forming a handheld device comprising a housing, an electro-optical distance measurement unit arranged in the housing for ascertaining at least one measured distance between the laser distance meter and a target object in a measurement direction, and a camera having a field of view in the measurement direction. A deflection unit is disposed in the housing for the angular deflection of the measurement direction and an operating and input arrangement for operating at least the distance measurement unit and the camera. A control unit at the housing is configured to activate the distance measurement unit and the deflection unit such that a series of measured values of the measured distance are recorded in different deflections along a path of the deflection, and a subsequent selection of the measured distances from the series of measured values is carried out using the operating and input arrangement.

12 Claims, 4 Drawing Sheets

(56) References Cited

U.S. PATENT DOCUMENTS

| | | |
|---|---|---|
| 8,422,035 B2 | 4/2013 | Hinderling et al. |
| 8,699,756 B2 | 4/2014 | Jensen |
| 8,767,191 B2 | 7/2014 | Gogolla et al. |
| 8,797,511 B2 | 8/2014 | Tiefenthaler et al. |
| 10,222,476 B2 | 3/2019 | Herbst et al. |
| 2003/0098973 A1 | 5/2003 | Schmidt et al. |
| 2006/0192946 A1 | 8/2006 | Walser |
| 2011/0066399 A1 | 3/2011 | Mahajan |
| 2012/0105825 A1* | 5/2012 | Gogol .................. G01C 15/002 356/8 |
| 2014/0247439 A1 | 9/2014 | Neier et al. |
| 2015/0098075 A1* | 4/2015 | Bestler .................. G01S 7/4817 356/3.01 |
| 2017/0168160 A1* | 6/2017 | Metzler .................. G01S 17/86 |
| 2017/0269213 A1 | 9/2017 | Luthi et al. |

FOREIGN PATENT DOCUMENTS

| | | |
|---|---|---|
| CN | 107192380 A | 9/2017 |
| DE | 196 48 626 A1 | 5/1998 |
| DE | 101 57 378 A1 | 6/2003 |
| DE | 10 2005 037 251 A1 | 2/2007 |
| DE | 10 2010 062 161 A1 | 5/2012 |
| DE | 10 2010 062 172 A1 | 5/2012 |
| DE | 10 2012 112 940 A1 | 6/2014 |
| EP | 1 890 168 A1 | 2/2008 |
| EP | 2 053 353 A1 | 4/2009 |
| EP | 3 091 333 A1 | 11/2016 |
| JP | 2003-302209 A | 10/2003 |
| WO | 2007/014812 A1 | 2/2007 |
| WO | 2007/028667 A1 | 3/2007 |
| WO | 2010/092087 A1 | 8/2010 |

\* cited by examiner

90 selecting a measurement mode on the basis of which an automatic activation of a deflection unit in the handheld device occurs

91 manually targeting a target point using the handheld device and triggering a measurement

92 automatically deflecting the measurement radiation by way of the deflection unit on the basis of the measurement mode with a determination of a series of measured values in surroundings around a targeted target point along a measurement path in accordance with the selected measurement mode by the handheld device

93 storing the series of measured values for this measurement point for a subsequent analysis

94 subsequently selecting one or more of the measured values from the series of the measured values as the measurement result

Fig. 9

HANDHELD LASER DISTANCE METER

CROSS-REFERENCE TO RELATED APPLICATIONS

This application claims priority to European Patent Application No. 18193809.3 filed on Sep. 11, 2018, which is incorporated herein by reference.

FIELD OF THE INVENTION

The invention relates to a laser distance meter in the form of a handheld device and a method for measuring using the same distance meter, and a computer program product in this regard according to the claims.

The invention relates to a handheld device for electro-optical distance measurement, often also referred to as a handheld distance meter, handheld distance measuring device, Disto, EDM, Distometer, LaserDisto, Distomat, distance measure, laser distance meter, etc. This is a handheld device, i.e., a device which is held in the hand during the measurement, for simple measuring work, for example, in trade work or in construction measurement. Some device embodiments can in this case, in addition to a simple distance measuring functionality, for example, also compute areas, volumes, angles, inclinations, sloping distances, elevation angles, etc., store associated metadata such as images or other attributes, and/or can provide a data transmission to other devices, such as laptops, tablet PCs, smart phones, etc.

The distance measurement is performed optically here using visible or invisible light, often using a semiconductor laser as a light source, and is usually based on a time of flight or runtime measurement or a measurement of phase shifts of a component of emitted light pulses reflected from a target object, preferably with an accuracy around the millimeter range or less. In this case, diffuse reflections on natural surfaces are usually used, but sometimes also special reflective films or the like are applied to the target object.

For example, a measuring device for contactless distance measurement is known from DE 101 57 378, which comprises an optical emitting path having an optical emitter and an optical receiving path having a receiver optical unit and an optical receiver and also a device module, which accommodates the components of emitting and receiving modules. To maintain a high measurement accuracy over the entire temperature range, the components of emitting and receiving paths are placed in such a way that in the event of a temperature-related curvature of the device module in the direction of the optical axes of emitting and receiving paths, the optical axes thereof are deflected by the same amount in the same direction.

BACKGROUND

A handheld electro-optical measuring device for distance measurement is described in the published application WO 2007/028667, which comprises an emitting path having an optical emitter and a receiving path having at least one receiving optical unit for bundling a measurement signal in the direction of a receiver. A shared optics carrier body comprises the components of the emitting and receiving paths in this case.

A handheld laser distance meter is known from DE 10 2010 062 161, which is equipped with a regulator to compensate for a natural shaking movement (tremor). An optical actuator is used for this purpose, which pivots the entire optical unit. The optical unit is pivoted in this case out of the starting position into a variable compensation position in such a manner that the emitting path is stabilized fixed in space in the decoupled region outside the measuring device with compensation of the movement of the housing during the measurement.

DE 10 2012 112 940 discloses a handheld laser distance meter, having at least one laser unit, which is provided to emit at least one laser beam in relative directions variable in at least one measurement plane, and having at least one receiving unit, which is provided to acquire at least a part of the light of the laser beam reflected from a surface to be measured. In this case, the receiving unit comprises a cylinder optical unit having at least one spheric and/or aspheric cylinder lens.

Using a handheld measuring device of the present invention, a measurement target or measurement point is targeted by hand in this case—i.e., by holding the handheld measuring device in the hand and manually aligning the laser measurement axis on a desired target point, for example, as in WO 2007/014 812, DE 10 2005 037 251, DE 10 2010 062 172, etc. These are thus in contrast to laser tachymeters, reference-line-projecting devices, laser scanners, total stations, etc. which are not according to the invention, are fixedly stationed, and are usually moved by motors, and which are disclosed, for example, in EP 1 890 168, EP 2 053 353, EP 3 091 333, DE 196 48 626, WO 2010/092 087 or others, and in which the distance measurement radiation is pivotable around two axes perpendicular to one another, which are equipped with angle meters.

With respect to the tasks usually carried out using the handheld devices according to the invention for measuring structures, it is often an essential aspect that a plurality of the significant spatial points to be measured are connected to one another by corners, edges, or the like and/or are delimited thereby. For example, an edge which separates a wall of a room from the ceiling connects two corner points of the room. If all four corner points of the ceiling of a room having rectangular outline are to be measured, for example, one corner point after the other can thus be measured using the construction measuring handheld device, by manually targeting them using the measuring laser or a pilot beam substantially coinciding therewith. The spatial points to be measured are activated in this case by the user of the device by hand and according to one embodiment, a measurement result can then be determined from the measurement data resulting in this case—optionally jointly with a predetermined relative relationship between the spatial points—wherein the latter analysis or at least parts thereof is often also carried out later in an office and not directly at the location of the measurement.

However, it is often quite demanding or difficult in this case for a user of the handheld device to target the desired measurement target point precisely using the measurement light beam of the handheld device and trigger a measurement exactly on this target point, especially since the desired measurement point is often located quite a few meters away and the measurement point is moreover comparatively small for this distance. Unsteady holding of the device, for example, due to tremors, shaking, etc., can also interfere in this case and often also further reduce in practice the actual measurement accuracy achievable by the device as such. In particular in the case of measurements outside, it can additionally occur in this case that because of the ambient light, the measurement point can no longer be seen clearly and unambiguously. Digital viewfinder images from a camera in the measuring device can sometimes provide improvements (for example, by optical and/or digital enlargement, displaying a crosshair, recognizing the measurement light in the image data, etc.), however, often either an excessively large or excessively small zoom factor is also provided here to carry out a precise handheld targeting on a specific, desired measurement target point.

In the case of many measurements, especially in the field of construction sites, it also often occurs here that it is only established during a later analysis and use of the measurement data in the office that alternatively or additionally a measurement on an adjacent measurement point would have been required or advantageous to complete the measurement for the object to be achieved. This often makes necessary a renewed trip to the construction site and a further measurement.

Multiple measurements from a measuring device position to multiple, often closely adjacent measurement points are frequently also necessary. This complicates not only the sequence with a plurality of measurements, but rather also includes the risk that the many closely adjacent measurement points will be confused or transposed, or also one of the many measurement points will be forgotten or omitted.

Especially when measuring in the field of structures or construction, geometric features such as edges, corners, borders, tips, bends, rounded areas, round rods, recesses etc. are often essential features where it is necessary to measure. However, in practice in particular these geometric features are often difficult to target, especially using a handheld measuring instrument of the present invention. Moreover glancing intersections of the measurement light on geometric features also often occur when targeting corners and edges, or multi-target measurements result which cannot be resolved or cannot be resolved unambiguously by the distance measurement unit of the measuring device. Especially a distortion of the light pulses on an edge, in the case of which both a part of the foreground of the edge and also a part of the background of the edge (and possibly even also a part of a surface connecting the foreground and the background) are struck by the measurement light point, obstructs the measurement and can result in inaccurate or even incorrect measurement results or at least measurement results not corresponding to the intention.

SUMMARY

It is therefore an object of some embodiments of the present invention to improve a handheld laser distance meter, in particular in regard to at least one of the above-mentioned problems. The methods for measuring using such devices and/or the analysis of the measurements are also to be improved.

Not only, for example, is in this case the object of reducing measurement errors, incorrect measurements, and the requirement for supplementary additional measurements to be achieved using embodiments of the improvement of the handheld laser distance meter, but rather, for example, additional, novel measurement principles and measurement approaches can also be achieved using the handheld device according to the invention.

These objects are achieved according to some embodiments of the invention by the features of the independent claims and/or by features of the dependent claims or these achievements are refined, respectively.

The present invention relates to a laser distance meter in the form of a handheld device having a housing for manual use. The handheld device is especially configured in this case to be held in the hand during use—i.e., for example, measuring geometric objects, such as rooms or spatial regions, construction sites, items of furniture, structures, blanks, etc.—and does not necessarily have to be fixedly stationed in space on a tripod or the like.

An electro-optical distance measurement unit for ascertaining at least one measured distance between the laser distance meter and a target object in a measurement direction is arranged in the housing in this case. This distance measurement unit can be formed in this case, for example, having a light emitter, in particular a semiconductor light source such as an LED or a semiconductor laser, for emitting an optical measurement light beam, and an electrical photoreceiver for detecting components of the optical measurement light beam which are reflected or backscattered from the target object. An optical unit can be formed in this case in particular having an emission optical unit having an emission collimation lens for collimating the emitted optical measurement light beam along a measurement axis in a measurement direction to the target object, and a receiving optical unit having a converging lens for receiving the reflected or backscattered components from a receiving direction on a photosensitive region of the photoreceiver.

An electronic analysis and control unit is configured in this case for ascertaining at least one measured distance based on the reflected or backscattered components of the optical measurement light beam according to a signal runtime and/or phase measurement principle, for example, on the basis of a measurement of a time-of-flight runtime of one or more pulses of the optical measurement light beam from the device to the target object and back, which is proportional to the distance to be measured via the speed of light.

A camera in the housing having a field of view in the measurement direction is configured in this case for capturing or recording an image of the target object, which image—in addition to an emission of a visible light beam in the measurement direction—is also usable as an electronic viewfinder image for targeting the target object or target point of the distance measurement. One or more images or image details from a video or a live display can also be used in this case as an image in this meaning.

According to some aspects of the invention, a deflection unit for the deflection, especially for the angle deflection, of the measurement direction in relation to the housing, i.e., especially a deflection of the measurement axis, i.e., of at least the emission direction of the emitted optical measurement light beam, is also in the housing of the handheld device. This deflection is carried out in this case using an active drive in the device, during the operation of the handheld device and not only solely for the alignment or calibration of an otherwise fixed measurement direction of the device. The deflection is restricted in this case in its extent and is located within at least a subregion of the field of view of the camera, which field of view is not deflected by the deflection unit. An operating and input arrangement arranged on the housing is configured in this case for operating at least the distance measurement unit and the camera, for example, having a visual display arranged on the housing and coupled to the operating and input arrangement, on which the image of the camera as an electronic viewfinder, and also an operating status of the handheld device and measurement results of the handheld measuring device, are displayable.

A control unit is also arranged in this case in the housing, which control unit is configured to activate the distance measurement unit and the deflection unit in such a way that a series of measured values of the measured distance in different deflections is recorded along a measurement path of the deflection. The operating and input arrangement is configured in this case accordingly to carry out a subsequent selection of one or more of the measured distances from the series of measured values.

The deflection unit of the handheld device can be configured in this case, for example, having a deflection range of the deflection which is limited to an angle range of less than +/−10°, preferably of less than +/−5°. The handheld device is thus not configured having a deflection unit for acquiring a substantially whole space or half space or the like—i.e., for example, in particular not as a classic laser scanner or rotation laser. The deflection range of the present invention can substantially correspond, for example, to the field of view of the camera of the electronic viewfinder of the handheld device or a preferably central subregion of this field of view. The visual display or the display screen can also in this case display at least a part of the image of the camera, overlaid with a display of multiple measurement points of the series of measured values, as an electronic viewfinder image. For example, the visual display and its control unit can also be configured in such a way that the image of the camera or a detail thereof is displayed as a sketch, and also the series of measured values is displayed as an associated outline, in which outline and/or sketch at least one location of a measurement point to be determined is selectable.

In one embodiment, the deflection unit can be configured as one-dimensional, i.e., for the deflection in only one single direction, preferably along a straight line. In addition to a straight line passed through back and forth or in one direction, preferably repeatedly, as the measurement path of the deflection unit, other forms of measurement paths, preferably closed measurement paths, can also be provided. In one preferred embodiment, for example, a selection between a conventional point measurement and at least one scanned measurement path can also be provided by the operating and input arrangement. The operating and input arrangement can be configured in this case in such a way that the series of measured values is provided, for example, as a local profile section along a deflection range around the measurement point, optionally using a polygon train, which is interpolated in the series of measured values.

In another embodiment, the deflection unit can be configured for the deflection in two-dimensional directions. The operating and input arrangement can accordingly be configured in such a way that the series of measured values is provided as a local point cloud of a deflection range around the targeted measurement point. In one embodiment, the handheld device can be configured in this case having both a visible pilot light beam fixed in the direction in relation to its housing, for targeting a measurement point, and also having a deflection unit, using which a (preferably invisible) measurement light beam of the distance meter is deflectable in relation to the pilot light beam in one or in two spatial angle directions.

In a refining embodiment, an inertial measurement unit (IMU) (or an inclination or acceleration sensor and/or a gyroscope or compass) can be arranged on the housing, which unit is arranged and configured so as to optionally carry out an activation of the deflection unit in dependence thereon. On the basis of the measured values of the IMU, for example, the deflection unit is activated in this case in such a way that the deflection of the measurement light takes place in the deflection range in a defined direction, for example, preferably defined in a horizontal or vertical direction. In another example, a plurality of the series of measured values can form a global point cloud, which is larger than the actual deflection range of the deflection unit. This can be performed, for example, in that for the global point cloud, in each case corresponding to an alignment of the handheld device, which is associated with the respective distance measured values of the series of measured values and is determined by the IMU, and an associated direction of the deflection of the deflection unit is combined to define a point of the point cloud in its spatial location.

At the same time, some embodiments of the invention also relate to an associated method for measuring buildings or rooms using a handheld laser distance meter, preferably as described here, in particular comprising at least one electro-optical distance meter, a camera, a display screen, and a deflection unit for a measurement radiation of the distance meter.

In the method, for this purpose a measurement mode is selected, on the basis of which an automatic activation of the deflection unit occurs, and a measurement point is targeted manually, preferably free-handed, using a target axis of the measurement radiation of the handheld laser distance meter. Upon triggering of a measurement, an automatic deflection of the measurement radiation is performed in this case by the deflection unit on the basis of the measurement mode, to determine a series of measured values in surroundings around the measurement point along a measurement path in accordance with the selected measurement mode at various deflections. The measurement point as such is preferably also in this case a point of the series of measured values. Accordingly, the series of measured values for this measurement point is stored for a subsequent analysis of the measurement point, which optionally has a subsequent selection of one or more of the measured values from the series of measured values, or optionally also a value interpolated between these measured values, as a measurement result. In other words, not only the targeted measurement point as such, but rather additionally also limited surroundings or immediate neighborhood of the measurement point is thus acquired by the handheld device and provided during the analysis of the measurement.

In this case, a selection of the measurement mode can be performed from at least one of at least the following:
- a horizontal profile measurement mode, in which the deflection occurs along a substantially horizontal straight line as the measurement path,
- a vertical profile measurement mode, in which the deflection occurs along a substantially vertical straight line as the measurement path,
- a free direction profile measurement mode, in which the deflection occurs along a straight line selectable via an operating unit or by a corresponding bearing of the handheld device as the measurement path,
- a cross profile measurement mode, in which the deflection occurs along two straight lines at 90° to one another as the measurement path,
- a circle acquisition mode, in which the deflection occurs along a circle or an ellipse as the measurement path,
- a field of view surface acquisition mode, in which the deflection occurs in two dimensions over a surface or a spatial angle, which substantially corresponds to the viewing angle of the camera, or
- a selected region surface acquisition mode, in which the deflection occurs in two dimensions over a surface or a spatial angle which corresponds to a preferably central subregion of the viewing angle of the camera.

The measurement path can be formed in this case in one embodiment, for example, as a straight line, and the series of measured values can form a profile section around the measurement point. In this case, in particular a horizon-referenced orientation of the straight line can be displayable on the device, or such a horizon-referenced orientation can be automatically maintained by the deflection unit in accordance with a specification. In another embodiment, the measurement path can form a circular ring, an ellipsoid, a cross, a line, etc., preferably wherein the measurement path is traveled as at least part of a closed path by the deflection unit.

In the profile section, for example, a polygon train or a line train having at least one straight line can be automatically fitted by a processing unit in this case, wherein the polygon train is provided as a measurement result for analysis on a visual display.

In one embodiment, the measurement path can be formed as a two-dimensional scanning path of a spatial angle or surface region, in particular as successive line-by-line grid scanning or zigzag scanning. The measurement result of the measurement path can in this case be provided, for example, as a local point cloud around the measurement point. Geometrical primitives such as straight lines, polygon trains, circular arcs, flat surfaces, cuboids, or cylinders can preferably be recognized in this case by a processing unit automatically or semi-automatically in the local point cloud and/or in the image of the camera and/or can be fitted into the local point cloud. For example, a machine-learning artificial intelligence system can at least partially be used here.

In another embodiment, for example, a parallel, triangle, or sinusoidal scanning of the surface region can also be performed. Alternatively, a Lissajous scan (or a scan along another continuous path which does not repeat over many cycles) can also be carried out, the point density of which is increasingly refined with the scan duration.

A duration of the scan can especially be automatically determined depending on a duration of a steady holding of the handheld device (for example, determined by means of an IMU). For example, a compensation of an angular position of the measured values of the series can be performed in the case of a numeric compensation capability of unsteady holding of the handheld device. However, as soon as this unsteady holding can no longer be compensated, the measurement can be terminated. Such a compensation can in this case be performed passively, i.e., numerically, and/or actively, i.e., by activating the deflection unit. The deflection unit is configured according to the invention, however, so as to effectuate a targeted deflection of the measurement direction and not solely to compensate for wobbling, which can also be defined on a comparatively greater maximum deflection range, for example.

In one embodiment, during the manual targeting, a rough measurement can be performed with a slower deflection and/or lower distance resolution and/or distance accuracy and upon triggering, a fine measurement can be performed with faster deflection and/or higher distance resolution than the rough measurement, wherein during the manual targeting, a display of the rough measurement and/or a polygon train fitted in the rough measurement is performed with a marking of a presently targeted measurement point on a display screen, using which a more specific measurement point is selectable during the manual targeting over greater distances.

The manual targeting can be performed in this case via a visual display of the distance meter as an electronic viewfinder, which visual display also graphically provides the measurement mode and the series of measured values. In particular, the series of measured values and/or a measured value which is to be used as a measurement result can then in this case be selectable and/or editable on the visual display. After ending the targeting, subsequent selecting of one or more of the measured values from the series of the measured values or a value interpolated between these measured values as a measurement result of the measuring can in this case be performed.

The method according to some embodiments of the invention can also in this case be provided at least partially as a computer program product having program code, which is stored on a machine-readable carrier, is embodied as a hardwired logic, or as a computer data signal, embodied by an electromagnetic wave. Especially in the form of program code for carrying out parts of the above-mentioned method, in particular program code for activating a distance measurement unit and a deflection unit in a handheld distance meter, which activation takes place in such a way that a series of measured values is recorded in different alignments and thereafter a selection of a specific measured value from this series of measured values as a measurement result is performed. The program code can preferably be stored and/or executed in this case in a control unit of a distance meter configured as a handheld device.

BRIEF DESCRIPTION OF THE DRAWINGS

The method according to the invention and the device according to the invention are described in greater detail hereafter solely by way of example on the basis of specific exemplary embodiments schematically illustrated in the drawings, wherein further advantages of the invention will also be discussed. In detail, in the figures.

DETAILED DESCRIPTION

The illustrations in the figures are solely used for illustration and are not to be considered to be exactly to scale, unless explicitly indicated otherwise. Identical or functionally similar features are provided throughout with the same reference signs, if practical, and are possibly differentiated using a letter as an index. The illustrated schematic figures each show the basic technical structure, which can be supplemented or modified by a person skilled in the art in accordance with general principles. The expressions "essentially" or "substantially" express that a feature does not necessarily have to be exactly fulfilled 100% in the meaning of the invention, but rather that smaller deviations can also occur, especially in such a way that the technical effect of the feature is maintained in the meaning of the invention and/or in the scope of routine tolerances and inaccuracies in the embodiment or manufacturing.

Figures 1, 2:
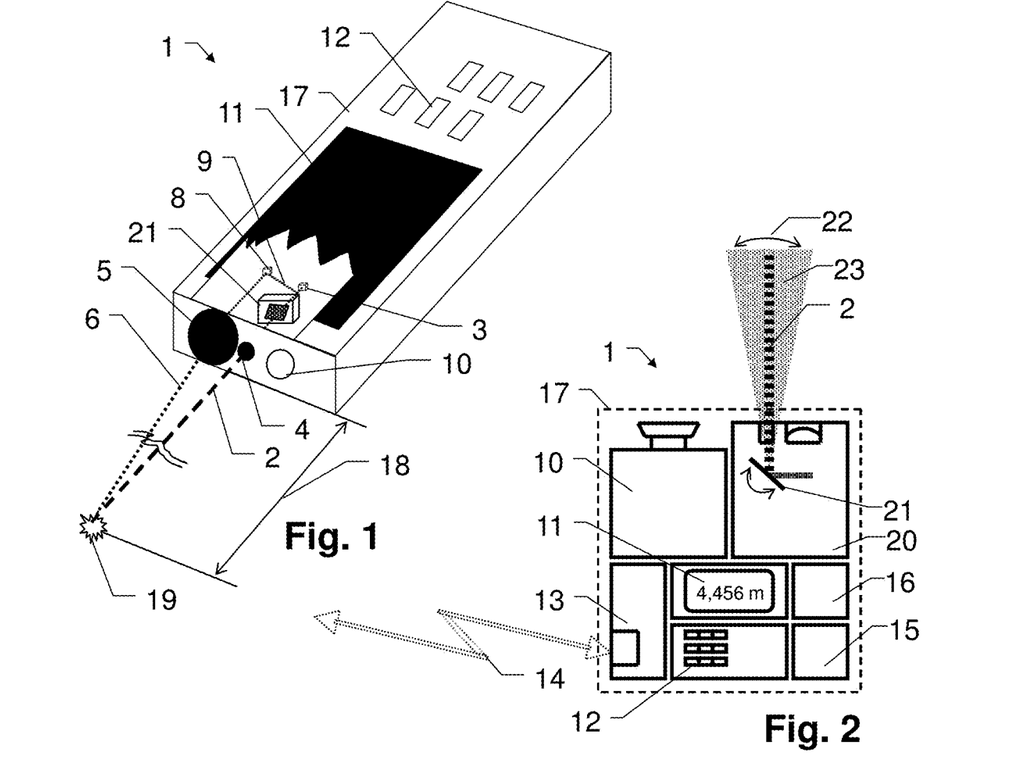
FIG. 1 shows an illustration of an exemplary embodiment of a handheld device according to the present invention.
FIG. 2 shows a block diagram of an embodiment of a handheld distance meter according to the invention.

FIG. 1 schematically shows one possible example of an embodiment of a handheld device 1 according to the invention. A handheld laser distance meter 1 is shown, which is configured comprising an internal camera 10 having a viewing angle in the measurement direction, using the image of which a measurement target 19 of the distance measurement can be targeted, which measurement target 19 is then determined in its distance 18 from the device 1 using a light beam 2 of the optoelectronic laser distance measurement. According to the invention, the handheld device 1 in this case comprises a deflection unit 21 controllable during the distance measurement, by means of which the measurement direction of the laser distance measurement is deflectable in a defined manner along a measurement path in at least a part of the viewing angle of the camera 10. For example, by the deflection unit 21 deflecting a light beam 2, which is emitted by a light emitter 3, such as, for example, a laser diode, and is preferably collimated via an emission optical unit 4, of the laser distance measurement in accordance with an activation signal of the deflection unit 21 in different directions.

In this embodiment, components 6 of the light beam 2 reflected from the target point 19 are then conducted via a receiving optical unit 5 to a photosensitive electrical component 8. A distance 18 to the target object 19 is thus ascertainable from a signal runtime of the light 2, 6 between emission and reception in accordance with the propagation speed of the light. An optional internal reference path 9 for a part of the emitted light is also shown here.

The above-mentioned components (with the exception of the target object 19) are housed in this case in the housing 17 configured so it can be handheld for the measurement procedure. The housing also comprises in this case an operating and monitoring unit, for example, having a visual display 11 or a display screen and operating elements 12, such as buttons, a touchscreen, capacitive sensors, gesture recognition, etc.

A schematic illustration of a handheld device 1 according to the invention is illustrated once again in FIG. 2. Reference is also made in this case and hereafter to the description of FIG. 1 with respect to the components. The camera 10, for example, in the form of a CCD or CMOS image sensor having a corresponding optical unit and the distance measurement unit 20 are shown in this case in the housing 17, and also an operating unit 12, a visual display 11, a control unit 16, and an analysis unit 15. A communication unit 13 for the communication 14 with external devices, which is wired, wireless, or takes place via storage media, can optionally also be provided in the handheld device 1.

The deflection unit 21 in the housing 17 can be configured in this case in one embodiment to change only the emission direction 2 of the distance meter 20 in a monitored manner as indicated by the arrows 22, wherein the receiving unit of the distance meter 20 is configured accordingly in this case to receive backscattering from the entire possible deflection range 23 of the deflection unit 21. For example, this can be performed using a correspondingly configured receiving optical unit, which always deflects the entire deflection angle range 23 onto an acquisition region of a photosensitive component.

In another embodiment, in addition to the emission direction 2, a receiving direction 6 can also be influenced by the deflection element 21, so that the receiver also always aims at the measurement point 19 targeted by the emitter. In one exemplary embodiment, in this case the receiving unit 8 can also be formed, for example, using photodetectors having internal amplification, for example, an SPAD array.

The deflection 22 can be achieved in this case in particular in the form of a transmission through—or in the form of a reflection on—an optical component in the corresponding beam path. The field of view of an optionally provided camera 10 in the device 1 is in this case always separate from the deflection unit 21, however, and is oriented deflection-free in a measurement direction which is fixed with respect to the device 1—thus no deflection of the field of view of the camera 10 is performed by the deflection unit 21.

Different embodiments can fundamentally be used for the principle of the invention with respect to the deflection unit 21, which is illustrated symbolically here in the form of a rotating mirror, for example:
 a rotating polygon wheel or another multifaceted component in reflection or transmission,
 a rotating mirror,
 a rotating mirror on an axis having tilt, such as, for example, a nutating mirror, Palmer scanner, etc.,
 an oscillating mirror having one or two axes of rotation or having a single-axis or dual-axis flexure or gimbal,
 an MEMS mirror,
 a rotating double-wedge system,
 a movable optical waveguide,
 a liquid lens or elastic lens,
 a movable lens or a movable lens pair, for example, also via flexures,
 an electro-optical modulator,
 an acousto-optical modulator,
 a multibeam approach having an arrangement of multiple emitting elements each having different emission directions, for example, in a line or a 2D array or a hologram, can be configured as an alternative embodiment to a deflection unit.

The emitting unit can also be configured, for example, having an LCD as a deflection unit 21, which generates an optical wedge effect due to application of an electrical voltage, since different indices of refraction thus resulting in the LCD effectuate different deflections 22 of a beam path penetrating the LCD. An embodiment having a deflection unit 21 having an MEMS mirror can represent a preferred embodiment because of its structural size and relatively simple activation capability for a handheld device 1. Alternatively to a continuous deflection, a deflection can also take place in discrete steps.

A relationship between the distance measurement points and the deflection 22 thereof and pixel coordinates of the camera 10 can especially also be acquired in this case or known. Therefore, for example, a present deflection 22 of the deflection unit 21 can be ascertained and/or spatial coordinates of the distance measurement points 19 can be ascertained, in particular having a distance measured value of the distance measurement and a one-dimensional or two-dimensional spatial direction of the deflection 22.

Figure 3:
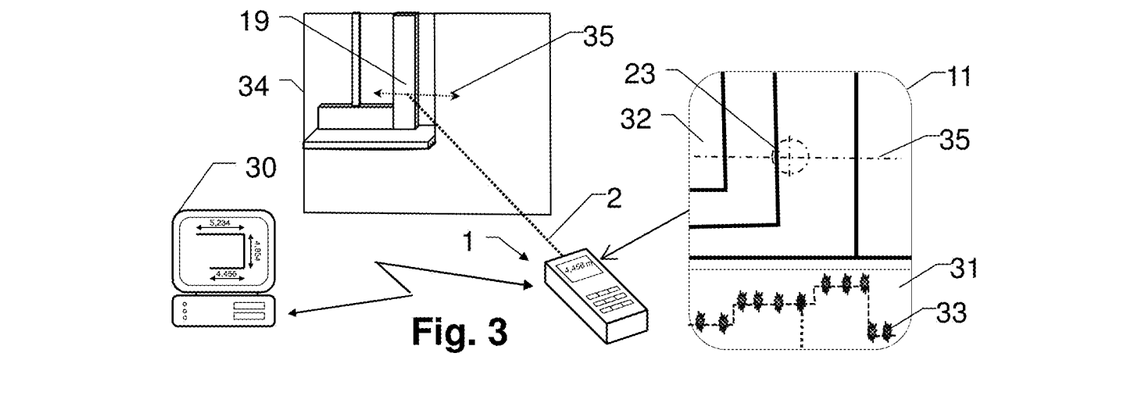
FIG. 3 shows a first example of an application of a handheld device according to the invention for measuring.

In the embodiment illustrated in FIG. 3, for example, a measurement path 35 of the deflection unit 21 in the device 1 is formed as a straight line, along which the measurement light beam 2 oscillates. In this case, a plurality of distance measurement points 33 are defined along the measurement path 35, wherein the targeted measurement target 19 is preferably located essentially in the middle of the straight line and preferably makes up one of the plurality of distance measurement points. The device 1 and a measurement point 19 targeted therewith freehand on a window in a room 34 are shown on the left—and an example of a display 11 on a display screen of the device 1, in which, inter alia, at least a part of an image 32 of the camera 10 of the device 1 is represented as an electronic viewfinder, is shown on the right.

A measurement of a profile section 31 in surroundings of the measurement target 19, which is targeted using the target axis 23, is effectuated in this case—as is shown in the lower display screen region, more or less as an outline of the camera image 32 on top. According to the invention, in this case even with the quite complexly structured measurement target 19 with manual targeting, one desired measurement point can be measured, or multiple closely adjacent measurement points can also be measured in a single measurement. The requirements for the targeting can be reduced according to the invention at the same time, since for this purpose even only after completed measurement, one of the measurement points of the recorded series 33 of measured values along the measurement path 35 can be selected as the desired measurement point having its distance value. Optionally, if necessary in this case an interpolated intermediate point located between the actually recorded points of the series 33 can also be selected subsequently as the measurement point. Therefore, not only can inaccurate targetings be corrected, but rather optionally also adjacent, also relevant measurement points can be ascertained using only one measurement, which is often a practical application of a measurement.

Therefore, for example, after completion of the measurement by the handheld distance meter 1, a different or further distance in the vicinity of the actually targeted measurement target 19 can also be extracted and provided. For example, this can take place in an associated image 32 of the camera 10, and/or in a displayed profile section 31 of the distance measurement points 33. A touchscreen, a cursor, or the like can be used in this case, for example. In addition to a selection of the measurement point on the device 1, this can also take place on an external device such as a PC 30 or tablet PC.

Figure 4:
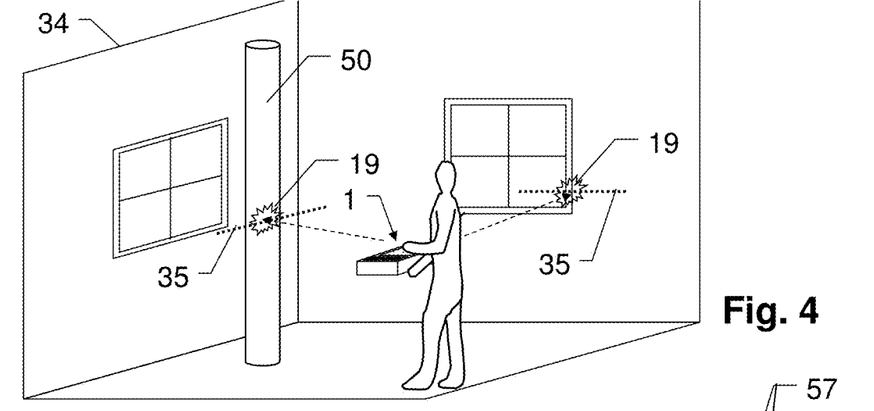
FIG. 4 shows a second example of an application of a handheld device according to the invention.

As shown in FIG. 4, for example, many features to be measured in construction, such as, for example, installed reveals, window frames, door frames, niches, etc. often contain multiple geometric features relevant for planning in a close spatial relationship, which have heretofore had to be measured and brought into relationship individually, which is often complex and susceptible to errors. Moreover—in particular over greater measured distances—targeting of a specific feature, for example, in a window reveal having multiple steps and edges, by manual targeting is often difficult and can result in undesired incorrect measurements. According to the present invention, a subsequent correction or selection of the measurement point can also be defined in this case, for example, on a specific feature, such as, for example, a minimum or maximum distance.

For example, a round column 50 can be measured according to the invention in its sectional profile and at the same time—without the necessity of exact manual targeting—a closest point of this column 50, or optionally its diameter and/or center axis, etc., can be measured.

Figure 5A:
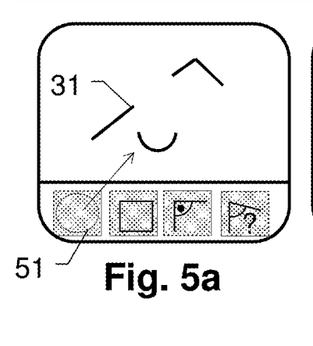
FIG. 5a, FIG. 5b, and FIG. 5c show an illustration of exemplary displays in the case of a measuring method according to the invention using a handheld measuring device according to the invention.
Figure 5B:
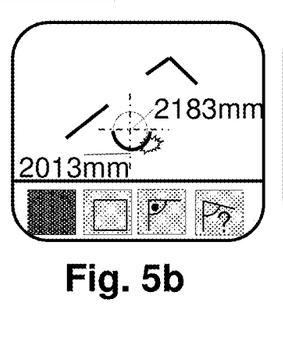

Therefore, for example, after completion of the measurement, a different or further distance in the vicinity of the actually targeted measurement target 19 can also be extracted and provided by the handheld distance meter. For example, this can be performed in an associated image of the camera, and/or in a displayed profile section of the distance measurement points. As shown in FIG. 5a and FIG. 5b, this can be performed, for example, in this case using an automatic recognition of a semicircular element in the recorded series of measured values of the profile 31, or by a manual selection of a template 51 of a round column at this point, which template can then be fitted manually, semi-automatically, or automatically in the profile. One other example among many would also be a rounding or chamfer on an edge or an edge itself, for example, which can also be recognized in a similar manner, for example, as a 90° circular arc, 45° inclination, or 90° corner and taken into consideration accordingly in the measurement.

Figure 5C:
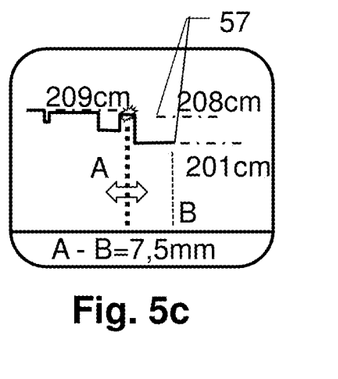

As shown in FIG. 5c, especially also local and/or global maxima and/or minima of the distance measurement points can be ascertained and provided during an analysis. On the basis of these maxima and/or minima, features such as corners, edges, etc. can then be detected and/or classified and thus measured by the user and/or a processing unit. Polygon trains or other geometrical basic elements such as circular arcs, rectangles, trapezoids, radii, etc. can also be fitted into the series 33 of the distance measurement points, for example, especially since many of the features to be measured are composed of such basic elements, or are at least supposed to be.

In this case, however, not only are the respective endpoints of the straight line measured and a route between them computed, but rather also at least one, preferably a plurality of points between them are measured, so that a type of profile section results.

The deflection unit 21 can be configured in one embodiment in this case in such a way that it provides a value of its present deflection by way of its activation or by way of a position encoder. Alternatively, in another embodiment a value of the present deflection can also be determined by an analysis of the location of a projected light spot of the optical measurement radiation in the image of the camera.

In one embodiment, the measurement path can be formed in this case as a straight line, along which the light beam oscillates and along which a plurality of distance measurement points are defined, wherein the targeted measurement target is preferably located essentially in the center of the straight line and makes up one of the plurality of distance measurement points. A measurement of a profile section in surroundings of the measurement target is effectuated in this case. In a special embodiment, alternatively at least one of the measurement modes of a measurement mode of a straight line deflection which can be aligned, a horizontal straight line deflection, a vertical straight line deflection, a cross-shaped straight line deflection, a circular or ellipsoidal line deflection, a parallel surface deflection, a zigzag surface deflection, a sinusoidal surface deflection, or a Lissajous surface deflection can be provided in this case by the device. As a measurement result, the plurality of distance measurement points are stored and/or provided for further processing in this case.

Figure 6:
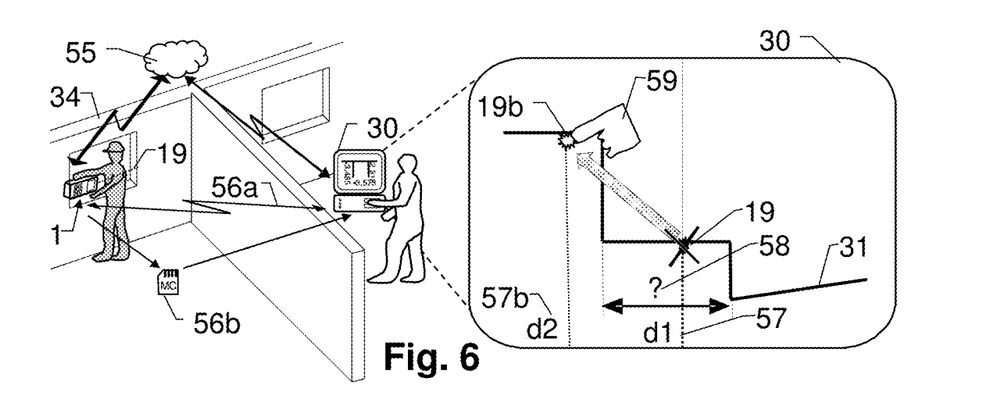
FIG. 6 shows a third example of an application of a handheld device according to the invention.

As shown in FIG. 6, in the case of a measurement using the handheld device 1 performed according to one embodiment of the invention, a different point 19b in the field of view of the camera 10 than the actual central targeted measurement point 19 can also be analyzed. This can be carried out in this case not only during the measurement in the field, but rather also thereafter. For example, after targeting and triggering the measurement, the handheld distance meter 1 can be taken in the hand again comfortably and without targeting, and a different or additional measurement point can be selected as the measurement result on its display screen. Alternatively, such a selection can also be performed on an external device 30, for example, a stationary or mobile computer, a tablet PC, a smart phone, etc., to which the measurement data, in particular the series of distance measured values 33 and/or the associated image 32 of the camera can be transmitted online 56*a*, offline 56*b*, via wire or wirelessly, or via a cloud service 55. At least a part of the analysis can also be automated, for example, in this case using an artificial intelligence system (AI), for example, by an automatic identification and/or classification of the image and/or distance measured values being performed by a computer 30 and its results being provided to the user. This can take place in the handheld device 1, in the external device 30, and/or in the cloud computing system 55, and can deliver more advantageous and/or accurate measurement results for the user, for example, than classic fitting of polygon trains, which is also possible. Such an automatic, preferably AI-assisted analysis can in particular in this case be performed transparently to the user in the background, without the user engaging in this automatic process or being aware of it. A handheld laser distance meter 1 according to the invention is configured in this case at least for the purpose of providing and/or storing the series of measured values 33 and/or a polygon train 31 derived therefrom and an associated camera image, but can optionally also provide at least a part of the described functionalities for analysis directly on the device 1.

In the case of shaking or wobbling during the triggering of the measurement or also when targeting complex geometric structures, according to the invention, for example, a desired measurement point in the surroundings of the targeted point 19 can only be exactly established later. In this case, the device 1 can optionally detect wobbling by means of a movement sensor (such as for example, an IMU), and can automatically notify the user to monitor the measurement point carefully. In one embodiment, a processing unit in the device 1 can also in this case be configured so as to carry out an automatic analysis of the recorded series of measured values 33, during which analysis it is recognized whether an unambiguous situation with respect to the distance measurement exists around the targeted measurement point 19. For example, whether surroundings of the measurement point 19 in the recorded series of measurement points 33 are formed (at least substantially) flat and/or linear, and therefore probably incorrect targeting cannot be present and the recorded measured value therefore also corresponds to the desired measured value with high probability. However, for example, if there are singularities in the series of measured values 33, if a differential observation of the series of measured values 33 has significant deflections, or if it may be concluded in another manner (for example, also using an AI system) from the series of measured values 33 or estimated with sufficient probability that surroundings around the target point 19 could potentially result in an incorrect measurement and/or uncertain targeting—for example, because a stepped profile is present—the processing unit can thus ascertain this from the measured values 33 and provide a corresponding notification, for example, by marking the measured value accordingly when storing it and/or prompting a user of the device 1 to perform an interactive verification of the measured value 19 and/or a possible adaptation thereof. In this case, the device 1 can, for example, display a recorded profile section 31 on the display screen after the measurement, on which the presently selected measurement point 19 is marked, and provide the functionality of displacing this measurement point 19 in the profile section 31 if necessary. The profile section 31 can be displayed in this case as raw data of the series of measured values 33 and/or in interpolated/abstracted form, for example, as a polygon train as shown, optionally jointly with a display of an associated camera image recorded by the device 1, which facilitates the orientation for the user.

In the example shown, postprocessing of the measurement data from a handheld device 1 from the field takes place on a PC 30, for example, to generate CAD production data or data for a 3D printer or a CNC machine and/or to adapt to a present, actual construction site situation. The measurement point 19, which is manually targeted and recorded using the device 1 by the user in a building 34, has been recorded in this case according to the invention with a series of measured values of the measured distance in different deflections around the targeted point 19. As shown on the right in the figure, during the extraction and/or analysis of the measured values for the further processing, it can then be established that during the measurement in the field using the manual targeting, a distance d1 57 to the point 19 was ascertained, while in contrast the adjacent distance d2 57*b* to point 19*b* is actually significant for the planning and/or manufacturing. According to the present invention, in the postprocessing, the user can now carry out a displacement 59 of the measurement point in the close surroundings of point 19, which are also recorded with the aid of the deflection unit, and/or a selection of one or more measurement points 19*b* in these surroundings. If necessary trigonometric corrections of the measured distance determined by the distance meter 20 can also be applied in this case in accordance with the associated deflection of the deflection unit 21. Therefore, without further measurement on the building 34, a measured value to the point 19*b* can be used. Optionally, the necessity can also arise during the planning phase of a project on the PC 30 of knowing the dimension 58, which is also ascertainable according to the present invention, at least with restricted measurement accuracy, which is however sufficient for this task, from the already existing data by way of a corresponding analysis of the recorded series of measurement points 33, so that a second measurement in the field 34 can be omitted. For example, it can thus be verified beforehand whether a screen present in the planned construction will also sufficiently cover the (possibly unplanned) step 58.

Figure 7:
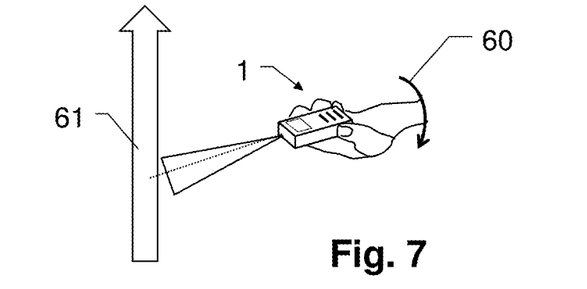
FIG. 7 shows a fourth example of an application of a handheld device according to the invention.

As illustrated in the embodiment of FIG. 7, not only can the handheld laser distance meter 1 optionally be held essentially stable for targeting a specific point during the distance measurement, but rather also can be moved by the user holding it in the hand, in particular essentially horizontally and/or vertically. In this case, a spatial orientation of the handheld laser distance meter 1 for each distance measurement—and thus also a spatial location of the distance measurement points 33 of the series—can be determined, for example, using an IMU (=inertial measurement unit), especially having an inclination or acceleration sensor and/or a gyroscope. A locally restricted point cloud around a measurement target can thus be ascertained, for example, which measurement target in this case can also be a specific edge, surface, corner, or the like.

In one special embodiment, a type of sustained fire mode can be selected in the handheld laser distance meter 1, in which, triggered chronologically or by modified device position 60, an automatic successive triggering of the acquisition of a series 33 of measured values takes place in each case. In consideration together with this plurality of series 33 of measured values, for example, a point cloud of a larger spatial region 61 can be recorded than that which is achievable by the deflection unit in a single series 33, by the manual targeting being carried out using a movement 60 of the device 1 over a desired spatial region 61 during the sustained fire mode. For example, in one embodiment, the measurement path of the deflection unit can be formed as a straight line, and this straight line can be guided by the manually-holding user substantially orthogonally to an edge to be measured, while successive series 33 of measured values are recorded along the straight line. In this case these series 33 can be related to a respectively acquired associated spatial orientation of the handheld device 1 and stored, especially, for example, in this case the spatial orientation can be ascertained using an IMU, an inclination sensor, by means of an SLAM navigation in the camera image, or the like.

Figure 8:
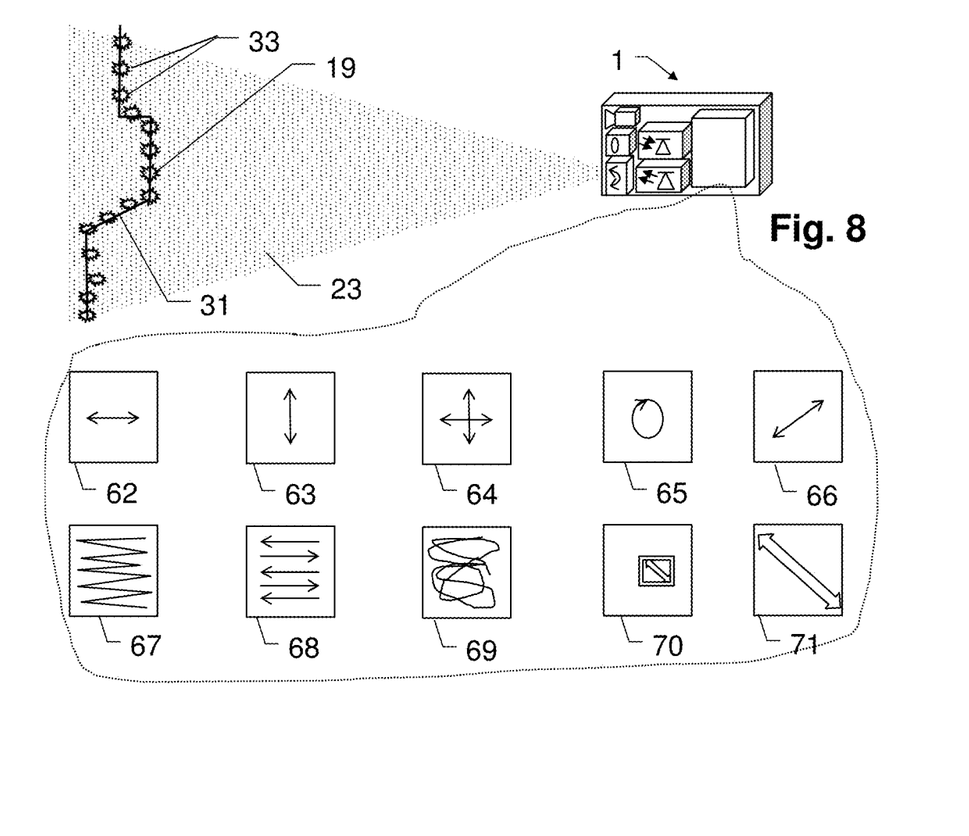
FIG. 8 shows a fifth example of an application of a handheld device according to the invention.

In a special embodiment of FIG. 8, at least one of the measurement modes of a measurement mode 62 to 71 can be provided alternatively in this case by the device 1. For example, using at least one measurement mode having a measurement path with: a horizontal straight line deflection 62, a vertical straight line deflection 63, a cross-shaped straight line deflection 64, a circular or ellipsoidal linear deflection 65, a straight line deflection 66 which can be aligned, a zigzag surface deflection 67, a parallel surface deflection 68, a sinusoidal surface deflection, or a Lissajous surface deflection 69. As the measurement result, the plurality of distance measurement points are in this case ascertained as a series of measurement points 33 along the selected measurement path and stored and/or provided for further processing. Optionally, not only can the entire series 33 be permanently stored, but rather the series 33 can also in this case only be stored temporarily, and after a selection of a specific measurement point, all except for the selected measurement point can be discarded.

A region of the image of the camera of the device can in this case optionally also be selected, in which the deflection is to take place along the measurement path, for example, in a selectable subregion 70 or in a full image region 71, in which the deflection range and displayed region of the image of the camera are adapted to one another. Such a measurement path can optionally in this case also be displayed on the display screen and/or marked by deflection of a visible pilot or distance measurement beam on the object.

Figure 9:
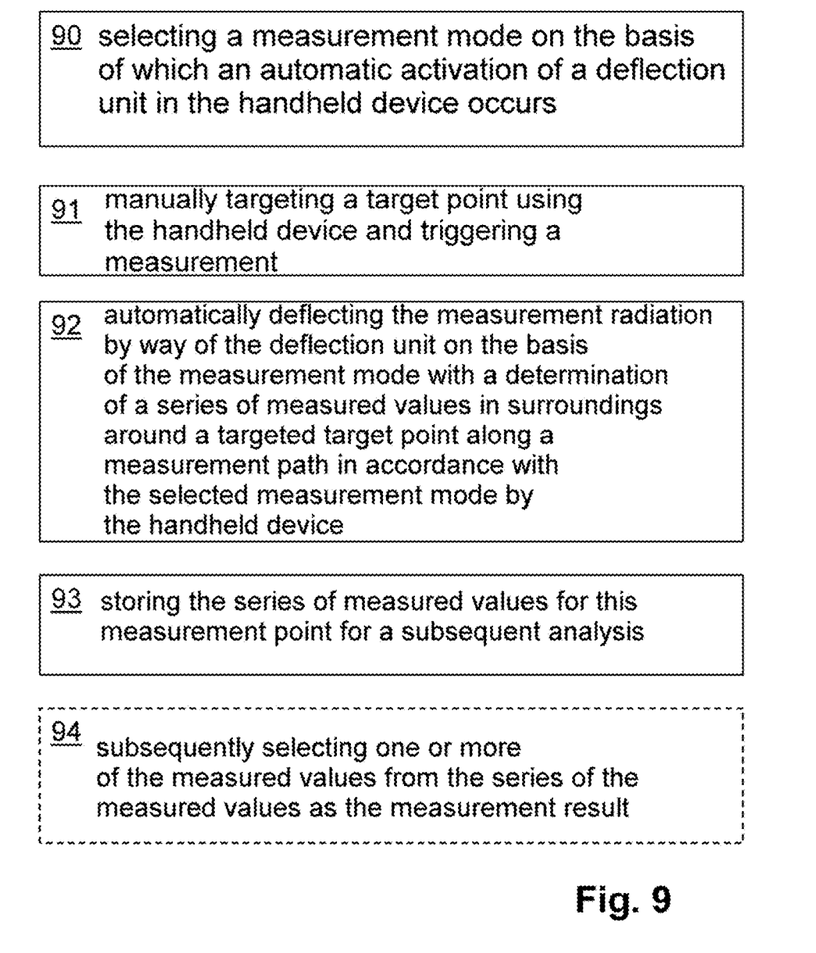
FIG. 9 shows a block diagram of an example of an embodiment according to the invention of a method corresponding to the present invention.

FIG. 9 shows a block diagram of an embodiment of a method for measuring in accordance with the present invention using a handheld device according to the invention.

In block 90, selecting of a measurement mode is performed, on the basis of which an automatic activation of a deflection unit in the handheld device takes place.

In block 91, manual targeting of a target point using the handheld device and triggering of a measurement are performed.

In block 92, automatic deflecting of the measurement radiation by the deflection unit on the basis of the measurement mode with a definition of a series of measured values in surroundings around a targeted target point along a measurement path in accordance with the selected measurement mode is performed by the handheld device.

In block 93, storing of the series of measured values is then performed for this measurement point for a subsequent analysis.

In block 94, subsequent selecting of one or more of the measured values from the series of the measured values as a measurement result is optionally performed.

What is claimed is:

1. Laser distance meter in the form of a handheld device, the laser distance meter comprising,
   a housing configured for manual use;
   an electro-optical distance measurement unit arranged in the housing, for ascertaining at least one measured distance between the laser distance meter and a target object in a measurement direction, the electro-optical distance measurement unit comprising:
      a light emitter for emitting an optical measurement light beam,
      a photoreceiver for detecting components of the optical measurement light beam which are reflected or backscattered from the target object,
      an optical unit comprising an emission optical unit having an emission collimation lens for collimating the emitted optical measurement light beam along a measurement axis in a measurement direction to the target object and a receiving optical unit having a converging lens for receiving the reflected or backscattered components from a receiving direction on a photosensitive region of the photoreceiver,
      an analysis and control unit for ascertaining at least one measured distance based on the reflected or backscattered components of the optical measurement light beam according to a time of flight or phase measurement principle based on of one or more pulses of the optical measurement light beam,
   a camera in the housing, configured to record an image of the target object having a field of view in the measurement direction,
   a deflection unit in the housing for deflecting the measurement direction in relation to the housing within at least a subregion of the field of view of the camera,
   an operating and input arrangement, arranged at the housing and configured to operate at least the distance measurement unit and the camera, having a visual display, which is arranged at the housing and is coupled to the operating and input arrangement and on which the image of the camera is displayable as an electronic viewfinder and on which an operating status is displayable, and
   a control unit arranged in the housing, which is configured for activating the distance measurement unit and the deflection unit in such a way that a series of measured values of the measured distance is recorded at different deflections along a measurement path of the deflection,
   wherein the operating and input arrangement is configured to carry out a subsequent selection of one or more of the measured distances from the series of measured values,
   and further wherein the deflection unit has a deflection range of the deflection which is limited to an angle range of less than +/−10°, wherein the deflection range essentially corresponds to the field of view of the camera of the electronic viewfinder of the device.

2. A laser distance meter in the form of a handheld device, the laser distance meter comprising,
   a housing configured for manual use;
   an electro-optical distance measurement unit arranged in the housing, for ascertaining at least one measured distance between the laser distance meter and a target object in a measurement direction, the electro-optical distance measurement unit comprising:
      a light emitter for emitting an optical measurement light beam,
      a photoreceiver for detecting components of the optical measurement light beam which are reflected or backscattered from the target object,
      an optical unit comprising an emission optical unit having an emission collimation lens for collimating the emitted optical measurement light beam along a measurement axis in a measurement direction to the target object and a receiving optical unit having a converging lens for receiving the reflected or backscattered components from a receiving direction on a photosensitive region of the photoreceiver, an analysis and control unit for ascertaining at least one measured distance based on the reflected or backscattered components of the optical measurement light beam according to a time of flight or phase measurement principle based on of one or more pulses of the optical measurement light beam, a camera in the housing, configured to record an image of the target object having a field of view in the measurement direction, a deflection unit in the housing for deflecting the measurement direction in relation to the housing within at least a subregion of the field of view of the camera, an operating and input arrangement, arranged at the housing and configured to operate at least the distance measurement unit and the camera, having a visual display, which is arranged at the housing and is coupled to the operating and input arrangement and on which the image of the camera is displayable as an electronic viewfinder and on which an operating status is displayable, and a control unit arranged in the housing, which is configured for activating the distance measurement unit and the deflection unit in such a way that a series of measured values of the measured distance is recorded at different deflections along a measurement path of the deflection, wherein the operating and input arrangement is configured to carry out a subsequent selection of one or more of the measured distances from the series of measured values, further wherein the deflection unit is configured for one of the following: the deflection in only one single direction and the deflection in two-dimensional directions, and wherein the operating and input arrangement is configured in such a way that the series of measured values is provided as a local profile section along a deflection range around the measurement point.

3. The laser distance meter according to claim 2, wherein an inertial measurement unit (IMU) or an inclination or acceleration sensor arranged at the housing is configured and linked to the deflection unit in such a way that:

the deflection unit is activated in such a way that the deflection takes place in a defined direction in the deflection range, or a plurality of the series of measured values form a global point cloud, which is larger than a deflection range of the deflection unit and in which point cloud in each case corresponding to an alignment of the device, which is associated with the respective measured values of the series of measured values and is defined by the IMU, and an associated direction of the deflection of the deflection unit is combined.

4. A method for measuring buildings or rooms using a handheld laser distance meter which includes at least an electro-optical distance meter, a camera, a display screen, and a deflection unit for measuring measurement radiation from the distance meter, the method comprising:

selecting a measurement mode, on the basis of which an automatic activation of the deflection unit is performed, manually targeting a measurement point using a target axis of the measurement radiation of the handheld laser distance meter, triggering a measurement, automatically deflecting the measurement radiation by way of the deflection unit on the basis of the measurement mode to define a series of measured values in surroundings around the measurement point along a measurement path in accordance with the selected measurement mode, wherein the measurement point as such is one point of the series of measured values, and storing the series of measured values for this measurement point for a subsequent analysis of the measurement point with a subsequent selection of one or more of the measured values from the series of the measured values as measurement result, wherein a selection of the measurement mode is performed from one of at least one of the following:

horizontal profile measurement mode, vertical profile measurement mode, free direction profile measurement mode, cross profile measurement mode, circle acquisition mode, field of view surface acquisition mode, or selected region surface acquisition mode.

5. A method for measuring buildings or rooms using a handheld laser distance meter which includes at least an electro-optical distance meter, a camera, a display screen, and a deflection unit for measuring measurement radiation from the distance meter, the method comprising:

selecting a measurement mode, on the basis of which an automatic activation of the deflection unit is performed, manually targeting a measurement point using a target axis of the measurement radiation of the handheld laser distance meter, triggering a measurement, automatically deflecting the measurement radiation by way of the deflection unit on the basis of the measurement mode to define a series of measured values in surroundings around the measurement point along a measurement path in accordance with the selected measurement mode, wherein the measurement point as such is one point of the series of measured values, and storing the series of measured values for this measurement point for a subsequent analysis of the measurement point with a subsequent selection of one or more of the measured values from the series of the measured values as measurement result, wherein the measurement path is formed as one of the following:

a circular ring, an ellipsoid, a cross, a line, or a two-dimensional scanning path of a surface region.

6. The method according to claim 4, wherein a polygon train having at least one straight line is automatically fitted by a processing unit into the profile section, which polygon train is provided as the measurement result for analysis on a visual display.

7. The method according to claim 5, wherein the measurement path is formed as a straight line and the series of measured values forms a profile section around the measurement point.

8. The method according to claim 4, wherein during the manual targeting, a rough measurement is performed using a slower deflection or lower distance resolution, and upon triggering a fine measurement is performed using a faster deflection or higher distance resolution than the rough measurement, and wherein during the manual targeting, a display of the rough measurement or of a polygon train fitted in the rough measurement having a marking of a presently targeted measurement point is performed on a display screen, with which a specific measurement point is selectable during the manual targeting over greater distances.

9. A method for measuring buildings or rooms using a handheld laser distance meter which includes at least an electro-optical distance meter, a camera, a display screen, and a deflection unit for measuring measurement radiation from the distance meter, the method comprising:

selecting a measurement mode, on the basis of which an automatic activation of the deflection unit is performed, manually targeting a measurement point using a target axis of the measurement radiation of the handheld laser distance meter, triggering a measurement, automatically deflecting the measurement radiation by way of the deflection unit on the basis of the measurement mode to define a series of measured values in surroundings around the measurement point along a measurement path in accordance with the selected measurement mode, wherein the measurement point as such is one point of the series of measured values, and storing the series of measured values for this measurement point for a subsequent analysis of the measurement point with a subsequent selection of one or more of the measured values from the series of the measured values as measurement result, wherein the manual targeting is performed via a visual display of the distance meter as an electronic viewfinder, which visual display also provides the measurement mode and the series of measured values graphically.

10. The method according to claim 4, wherein after ending the targeting, a subsequent selection of one or more of the measured values from the series of measured values or a value interpolated between them as the measurement result of the measuring is performed.

11. A computer program product having program code, which is stored on a non-transient machine-readable carrier, configured for carrying out parts of the method according to claim 4, wherein the program code is configured for carrying out an activation of a distance measurement unit and a deflection unit of a distance meter configured as a handheld device, which activation is performed in such a way that a series of measured values is recorded in different alignments and thereafter a selection of a specific measured value in this series of measured values as measurement result is performed.

12. The method according to claim 7, wherein the measurement result of the measurement path is provided as a local point cloud around the measurement point.

* * * * *